(12) United States Patent
Guzik et al.

(10) Patent No.: US 8,449,157 B2
(45) Date of Patent: May 28, 2013

(54) LIGHTED BICYCLE WHEEL HUB ASSEMBLY

(75) Inventors: David Guzik, Madison, WI (US); Kevin Blake, Sun Prairie, WI (US); Tim Clavette, Sun Prairie, WI (US)

(73) Assignee: Trek Bicycle Corp., Waterloo, WI (US)

( * ) Notice: Subject to any disclaimer, the term of this patent is extended or adjusted under 35 U.S.C. 154(b) by 57 days.

(21) Appl. No.: 13/211,085

(22) Filed: Aug. 16, 2011

(65) Prior Publication Data
US 2013/0044502 A1 Feb. 21, 2013

(51) Int. Cl.
*B62J 6/12* (2006.01)
*B60B 27/02* (2006.01)

(52) U.S. Cl.
USPC ......... 362/473; 301/110.5; 362/500; 280/279

(58) Field of Classification Search
USPC ...................... 301/110.5, 124.2; 362/473, 500
See application file for complete search history.

(56) References Cited

U.S. PATENT DOCUMENTS

| | | |
|---|---|---|
| 2,083,514 A | 6/1937 | Brown |
| 2,511,489 A | 6/1950 | Woermbke |
| 3,113,727 A | 6/1961 | Bradway |
| 3,099,401 A | 7/1963 | Bell |
| 4,381,537 A | 4/1983 | Hinrichs |
| 4,725,928 A | 2/1988 | Strepek |
| 4,796,972 A | 1/1989 | Thomas et al. |
| 4,860,176 A | 8/1989 | Bauwens et al. |
| 4,893,877 A | 1/1990 | Powell et al. |
| 5,015,869 A | 5/1991 | Schurmann et al. |
| 5,031,455 A | 7/1991 | Cline |
| 5,247,430 A | 9/1993 | Schwaller |
| 5,283,547 A | 2/1994 | Leon |
| 5,461,269 A | 10/1995 | De Raucourt |
| 5,497,302 A | 3/1996 | O'Donnell |
| 5,552,972 A | 9/1996 | Rezvani |
| 5,580,093 A | 12/1996 | Conway |
| 5,584,562 A | 12/1996 | Geran |
| 5,634,707 A | 6/1997 | Bailey, Jr. |
| 5,662,405 A | 9/1997 | Kuo |
| 5,800,035 A | 9/1998 | Aichele |
| 5,828,145 A | 10/1998 | Nakamura |
| 5,873,600 A | 2/1999 | Conway |
| 5,984,487 A | 11/1999 | McGhee |
| 6,037,690 A | 3/2000 | Hill |
| 6,118,196 A | 9/2000 | Cheng-Yon |

(Continued)

FOREIGN PATENT DOCUMENTS

| | | |
|---|---|---|
| EP | 0318147 B1 | 5/1993 |
| EP | 1405784 A1 | 4/2004 |

(Continued)

*Primary Examiner* — Diane I Lee
*Assistant Examiner* — Kenny C Sokolowski

(57) ABSTRACT

A bicycle wheel hub assembly having a number of light emitting diodes (LED's) that are powered by rotation of the wheel during use of the bicycle. The hub assembly includes a magnet and a coil that are both internal to the hub. The light emitting diodes are powered by current induced in the coil and controlled so as to preferably prevent illumination of discrete LED's when the respective LED's are directed toward a user during rotation of the hub. The LED's are supported by the hub and rotate with the hub during rotation of the wheel. In some embodiments, the LED's are attached to the hub at locations that are both laterally inboard and laterally outboard relative to a spoke flange of the hub assembly.

20 Claims, 8 Drawing Sheets

U.S. PATENT DOCUMENTS

| | | |
|---|---|---|
| 6,322,237 B1 | 11/2001 | Lee |
| 6,398,395 B1 | 6/2002 | Hyun |
| 6,501,199 B2 | 12/2002 | Hung |
| 6,550,945 B2 | 4/2003 | Chiu |
| 6,565,243 B1 | 5/2003 | Cheung |
| 6,749,321 B2 | 6/2004 | Luo |
| 7,021,800 B2 * | 4/2006 | Roberts .................. 362/473 |
| 7,048,421 B1 | 5/2006 | Allen-Atkins |
| 7,175,240 B2 | 2/2007 | Fultz et al. |
| 7,192,169 B2 | 3/2007 | Takeda |
| 7,405,501 B2 | 7/2008 | Peng et al. |
| 7,411,307 B2 | 8/2008 | Uno |
| 7,490,965 B2 | 2/2009 | Okada et al. |
| 7,525,204 B2 | 4/2009 | Kitamura |
| 7,625,108 B1 | 12/2009 | Peterson |
| 7,628,518 B2 * | 12/2009 | Fujii et al. .............. 362/476 |
| 8,337,060 B1 * | 12/2012 | Frankovich ............. 362/473 |
| 2002/0136021 A1 * | 9/2002 | Hung ...................... 362/500 |
| 2002/0163817 A1 * | 11/2002 | Bukowsky ............... 362/500 |
| 2003/0202356 A1 * | 10/2003 | Hung ...................... 362/500 |
| 2005/0047154 A1 * | 3/2005 | Chang .................... 362/473 |
| 2006/0202575 A1 | 9/2006 | Itoi et al. |
| 2006/0232988 A1 | 10/2006 | Wang et al. |
| 2006/0290231 A1 | 12/2006 | Lin et al. |
| 2007/0252452 A1 | 11/2007 | Ishimoto et al. |
| 2007/0258254 A1 * | 11/2007 | Kim ........................ 362/473 |
| 2008/0048531 A1 | 2/2008 | Chan |
| 2008/0101079 A1 | 5/2008 | Kitamura |
| 2008/0129157 A1 | 6/2008 | Nakano |
| 2009/0268479 A1 | 10/2009 | Lunde |

FOREIGN PATENT DOCUMENTS

| | | |
|---|---|---|
| EP | 1653594 A1 | 5/2006 |
| EP | 1381021 B1 | 4/2008 |
| EP | 1410982 B1 | 5/2008 |
| EP | 1918185 A1 | 5/2008 |
| EP | 1946996 B1 | 2/2010 |
| EP | 1849692 B1 | 4/2010 |
| EP | 2184791 A1 | 5/2010 |
| WO | WO 02/18198 A1 | 3/2002 |
| WO | WO 2005/014334 A2 | 2/2005 |

* cited by examiner

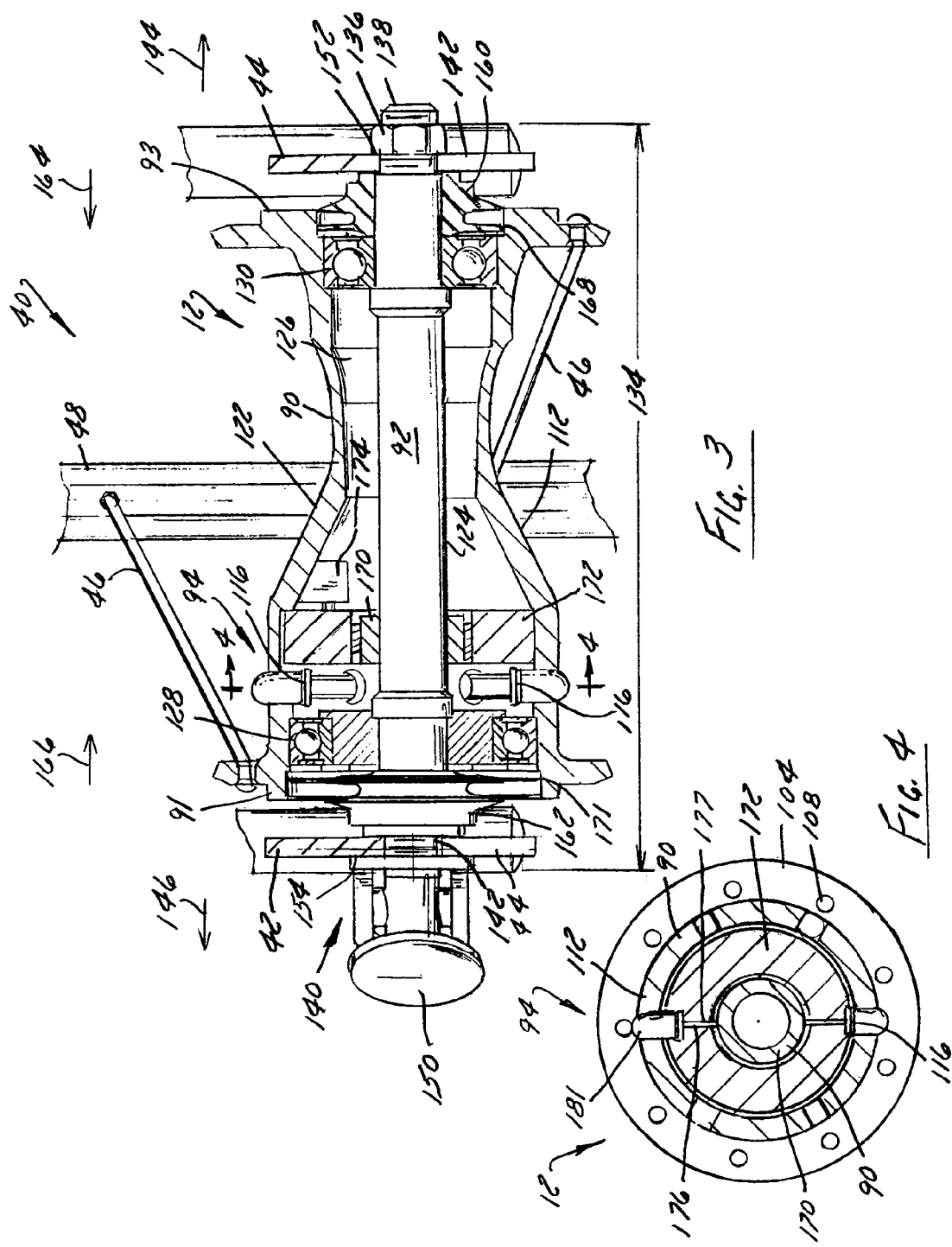

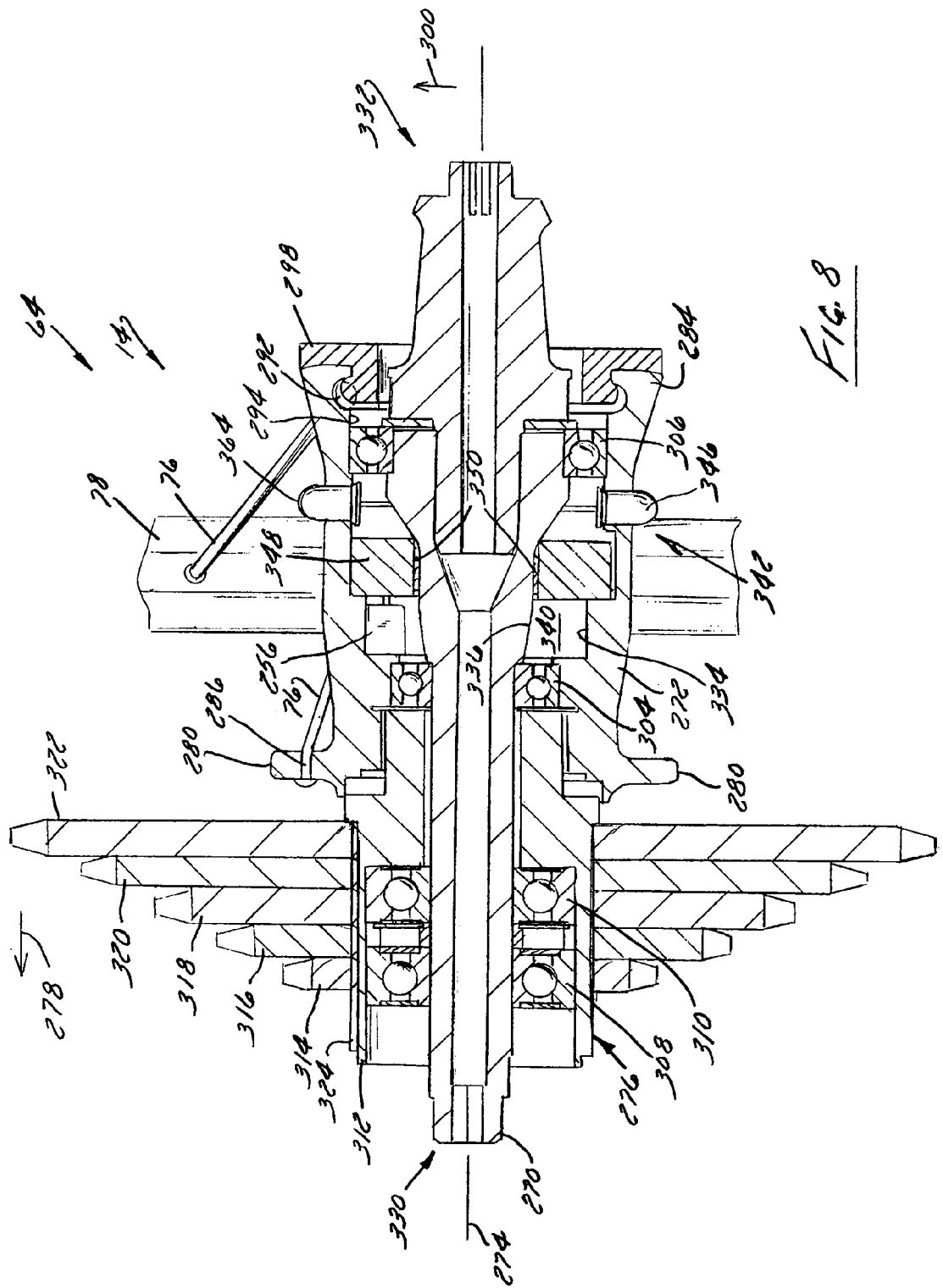

LIGHTED BICYCLE WHEEL HUB ASSEMBLY

BACKGROUND OF THE INVENTION

The present invention relates to bicycle lighting systems, more specifically, to a bicycle hub assembly having a lighting system that is powered by rotation of the hub assembly relative to the bicycle and includes one or more luminaries or light emitting diodes (LED'S) that are powered by rotation of the hub assembly.

Over the recent past, the market has witnessed a profound consumer interest in recreational bicycles. The consequence of this popularity of bicycle riding has been a growing presence of bicycle operators or cyclists, of all ages, on public roads or off road trails. Further, as the recreation has grown, typical bicycle excursions or trips have lengthened in extent and, concomitantly a great variety of lighter, multi-geared and faster bicycles have entered the marketplace. Increasingly, bicycle trips are made at later hours and for extended distances, to the extent that riders now are frequently encountered on the highways or trails at dawn or near or before sunrise as well as at dusk and into nightfall. Twenty-four hour off road races or night rides are also not uncommon. The safety aspects involved with such night riding are apparent and the necessity for providing a good light source, for both lighting a travel direction and improving the visibility of cyclist to others, has assumed considerable importance.

Whether the bicycle is used for recreation, transportation or competition, the bicycle industry is constantly improving the various components of the bicycle in order to keep up with rising consumer interest. Others provide light systems that are integrated in the hub assembly of the bicycle. Such systems can be battery powered or powered by a dynamo or other generator device having components that are associated and supported between rotatable portions of the bicycle assembly. As explained further below, room for improvement exists in both the functionality and the operation of such systems with respect to the underlying bicycle and in the illumination and/or visibility performance of such wheel based illumination systems.

Heretofore, lighting systems for bicycles have been designed more under ornamental considerations than under criteria meeting the actual operational needs of the cyclist. At the present, many cyclists use either a headlamp or lights or reflectors mounted to the frame or forks of a bicycle to illuminate a travel path. Many of these illumination devices require a battery power source. The addition of the battery power source increases the weight and bulk characteristics of the illumination system and requires periodic replacement of the light and/or the batteries to maintain operation of the light system. Such attributes detract from the light weight and ease of use associated with such serviceable bicycle structures.

As discussed further below, bicycle driven generators or dynamos are also commonly used instead of batteries. Such power sources are commonly driven by the rider and thereby require additional rider exertion to operate the illumination system. Such in-use powers systems are also motion and speed dependent, thus rendering such lighting systems inoperative or ineffective during low speed, stopping or other slow speed ride conditions. The change in illumination performance during such speed and/or steering maneuvering creates a less than desirable illumination performance of the lighting system.

Aside from the power source considerations discussed above, many illumination systems are limited to forward directed light sources and provide less than desirable left hand and right hand directed illumination or lighting performance. That is, the forward facing direction of such lighting systems, while providing adequate rider visibility at operating speeds, commonly provide less than desirable illumination for those locations located on the lateral opposite sides of the bicycle and rider.

Such illumination systems are also difficult to see or impossible to recognize as a cyclist when viewed from even nearby forward positions that are offset from the substantially forward facing direction of the light beam. Many such illumination devices are nearer imperceptible when viewed from offset distances, such as by the operators of automobiles, during different lighting conditions and positions relative to the lateral sides of the cyclist. Such limited visibility provides less than desirable visibility of the cyclist particularly during cross traffic situations.

Another consideration of such light systems concerns the unfortunate prevalence of thievery of valuable accessories from bicycles while they remain locked but unattended. More valuable, sophisticated equipment mounted upon a bicycle cannot be left unattended. The removal of such equipment for short periods wherein the bicycle is locked but unattended represents an operational inconvenience that detracts from the use or purchase of more expensive but quality equipment.

Those lighting systems that are supported by or otherwise configured to interact with the rotational operation of the hub can also detrimentally impact the functionality of other advancements in the bicycle arts. Many bicycles utilize, and many cyclists prefer, bicycle wheel assemblies that are connected to the bicycle frame and/or forks with a quick release assembly. Most quick release assemblies include a rotatable lever that is rotationally connected to an axle assembly. The lever is commonly rotatable between an "open" position and a "closed" position wherein the open position allows the tire or wheel to be removed from the bicycle and the closed position secures the wheel assembly for rotatable interaction with the bicycle. Such quick release assemblies allow a rider to quickly and conveniently remove and/or replace a tire and/or wheel assembly for service or replacement.

Bicycle wheel hub assemblies that include a power source such as one or more batteries, a generator, or a dynamo power source communicate the power signal to lighting sources that are supported by other structures of the bicycle that are positionally fixed relative to the bicycle frame. Said in another way, the lights and power sources are commonly on alternate structures relative to the rotational aspects of the wheels and the bicycle frame or other pivotable but non-rotatable structures of the bicycle. In such configurations, one or more wires or rotatable contacts extend between the hub and the illumination device to connect the power source to the illumination device. Such electrical connections tend to interfere with the functionality of a wheel quick release assembly in that the wires tether the wheel assembly to the underlying bicycle. Said in another way, wheel assemblies connected to such illumination devices cannot be simply removed and replaced without interfering with or otherwise manipulating one or more of the components of the illumination system.

In view of the above, there is a need for an improved bicycle lighting system that includes a light and power source that is light weight, improves lateral visibility of the bicycle, can be controlled to provide a desired illumination characteristic and operation, is easily securable with the respective structures of the bicycle, and does not interfere with or detrimentally affect the functionality of other systems of the bicycle.

SUMMARY OF THE INVENTION

The present invention discloses a lighted bicycle wheel hub assembly and a method of forming a lighted bicycle wheel hub that overcomes one or more of the aforementioned drawbacks. One aspect of the present invention discloses a bicycle wheel hub assembly having a number of light emitting diodes (LED's) that are powered by rotation of the wheel during use of the bicycle. The hub assembly includes a magnet and a coil that are both internal to the hub. The LED's are supported by the hub and rotate with the hub during rotation of the bicycle wheel assembly such that the entirety of the physically connected components of the lighting system is supported by the wheel assembly.

Preferably, the light emitting diodes are powered by current induced in the coil and controlled so as to prevent illumination of discrete LED's when the respective LED's are directed toward a user's eyes during rotation of the hub. In some embodiments, the LED's are attached to the hub at locations that are both laterally inboard and laterally outboard of a respective spoke flange. Said in another way, the LED's are connected to the hub so as to be on opposite lateral sides of a single spoke flange of the hub assembly. Preferably, both the front and rear wheels of a bicycle are equipped with lighted hub assemblies that each includes one or more discrete light elements that rotate with the corresponding wheel assembly during use of the bicycle.

Another aspect of the invention that is usable with and/or combinable with one or more of the above features or aspects discloses a bicycle wheel hub that includes a skewer, a hub shell, and at least one opening formed in the hub shell. The skewer has a length that extends along a longitudinal axis of the skewer between a first end and a second end of the skewer such that the first end of the skewer removably cooperates with a first bicycle wheel support and the second end of the skewer removably cooperates with a second bicycle wheel support. The hub shell is positioned concentrically about the skewer to define a space between an outer radial surface of the skewer and an inner radial surface of the hub shell. A magnet is attached to one of the skewer and the hub shell and a coil is attached to the other of the skewer and the hub shell. The magnet and coil are oriented along the longitudinal axis of the skewer so that the magnet and coil are in proximity to one another such that rotation of the hub assembly induces a current in the coil. At least one luminary, such as a light emitting diode (LED), is supported by the hub shell and secured in the at least one opening of the hub shell. The at least one luminary is powered by relative rotation between the coil and the magnet. A control is configured to prevent operation of the at least one luminary for a portion of a rotational travel path of the at least one luminary when the luminary is rotationally oriented to generally face a rider of a bicycle during rotation of the hub shell.

Another aspect of the invention that is useable or combinable with one or more of the above aspects discloses a bicycle assembly having a frame that is adapted to support a rider. A handlebar is pivotably attached to the frame. The bicycle assembly includes a front wheel assembly and a rear wheel assembly. The front wheel assembly includes a front wheel hub, an axle that passes through the front wheel hub and extends beyond the front wheel hub to rotatably cooperate with the frame. A magnet and a coil are positioned between the front wheel hub and the axle and oriented so that relative rotation between the front wheel hub and the axle induces an electrical signal in the coil. A plurality of front wheel light emitting diodes (LED's) is operatively connected to the coil so that the electrical signal generated in the coil selectively powers the plurality of front wheel light emitting diodes.

The rear wheel assembly includes a rear wheel hub and a rear wheel axle that passes through the rear wheel hub and extends beyond the hub to rotatably cooperate with a chain stay and a seat stay of the frame. A rear magnet and a rear coil are positioned between the rear wheel hub and the rear wheel axle and oriented so that relative rotation between the rear magnet and the rear coil induce an electrical signal in the rear coil. A plurality of rear wheel light emitting diodes (LED's) is operatively connected to the rear coil so that the electrical signal selectively powers the plurality of rear wheel light emitting diodes. The front wheel assembly and the rear wheel assembly are connected to the bicycle assembly so that the plurality of front wheel LED's are oriented and powered to illuminate in a front wheel lighting schedule and so that the plurality of rear wheel LED's are oriented and powered to illuminate in a rear wheel lighting schedule that is different than the front wheel lighting schedule.

Another aspect of the invention that is useable or combinable with one or more of the above aspects discloses a method of forming a lighted bicycle wheel assembly of a bicycle. One of a magnet and a coil is secured to an axle and the other of the magnet and the coil is secured to an inside of a hub. The axle and the hub are concentrically oriented relative to one another so that the magnet is positioned proximate the coil to induce a current in the coil during rotation of the hub relative to the axle. A lighting system is provided that includes electrically connecting a first LED and a second LED to the coil so the current in the coil powers the first LED and the second LED. The first LED and the second LED are secured to the hub in alignment with respective openings formed in the hub. Operation of the first LED and the second LED is controlled during use of the lighting system such that illumination of one of the first LED and the second LED is suspending when the one of the first LED and the second LED faces toward a rider and independent of operation of the other of the first LED and the second LED.

These and other aspects and features of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

The drawings illustrate one preferred embodiment presently contemplated for carrying out the invention. In the drawings:

FIG. 3 is a cross-section view of the front wheel hub and wheel assembly taken line 3-3 shown in FIG. 1;

FIG. 4 is a cross-section view of the hub assembly in FIG. 3 taken along line 4-4 shown in FIG. 3;

FIG. 8 is an elevational cross-section view of the hub assembly shown in FIG. 7 taken along line 8-8;

Figure 1:
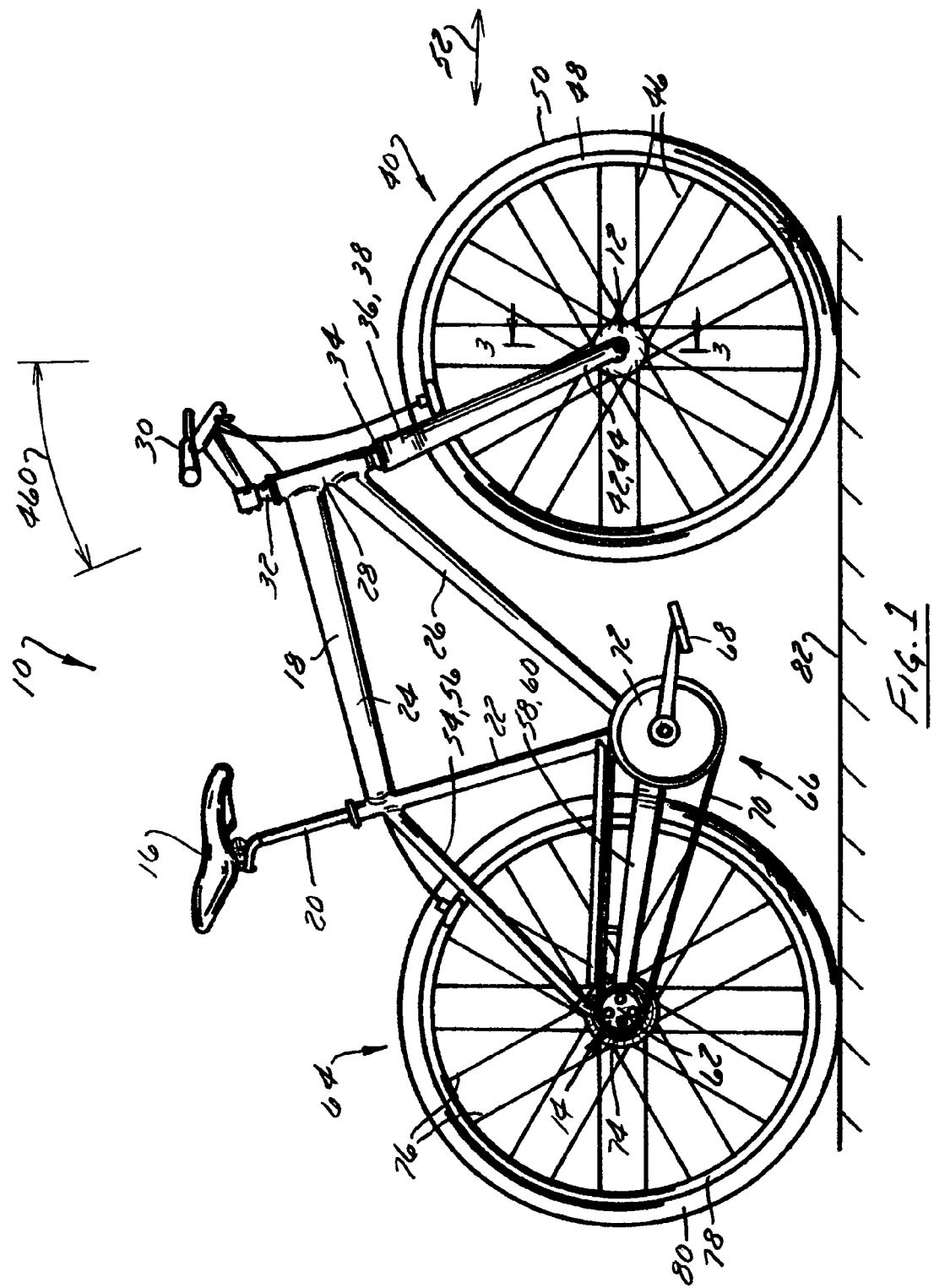
FIG. 1 is an elevation view of a bicycle equipped with a lighted front wheel hub assembly and a lighted rear wheel hub assembly accordingly to the present invention.

In describing the preferred embodiments of the invention that are illustrated in the drawings, specific terminology will be resorted to for the sake of clarity. However, it is not intended that the invention be limited to the specific terms so selected and it is to be understood that each specific term includes all technical equivalents that operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENT

FIG. 1 shows a bicycle 10 equipped with a lighted front wheel hub assembly or simply front hub assembly 12 and a lighted rear wheel hub assembly of simply rear hub assembly 14 according to the present invention. Bicycle 10 includes a seat 16 that is slidably attached to a frame 18. A seat post 20 is connected to seat 16 and slidably engages a seat tube 22 of frame 18. A top tube 24 and a down tube 26 extend forwardly from seat tube 22 to a head tube 28 of frame 18. A handlebar or handlebar assembly 30 is connected to a stem tube 32 that passes through head tube 28 and engages a fork crown 34. The position of handlebar assembly 30 is fixed relative to stem tube 32 and fork crown 34 such that handlebar assembly 30 and fork crown 34 rotate together relative to head tube 28.

A pair of forks 36, 38 extend from generally opposite ends of fork crown 34 and are constructed to support a front wheel assembly 40 at an end of each fork, a dropout, or fork tip 42, 44. Fork tips 42, 44 cooperate with generally opposite sides of front hub assembly 12 so as to secure a front wheel assembly 40 to bicycle 10. A number of spokes 46 extend between front hub assembly 12 and a rim 48 of front wheel assembly 40. A tire 50 is engaged with rim 48 such that rotation of tire 50, relative to forks 36, 38 rotates rim 48, spokes 46, and at least part of front hub assembly 12. Handlebar assembly 30 is connected to bicycle 10 such that side-to-side rotation of the handlebar assembly 30 rotates front wheel assembly 40 relative to a longitudinal axis, indicated by line 52, of bicycle 10 to effectuate steering operation of bicycle 10.

Frame 18 includes a seat stay pair 54, 56 and a chain stay pair 58, 60 that offset an axis of rotation 62 of a rear wheel assembly 64 from a crankset 66. Crankset 66 includes a pair of pedals 68 that is operationally connected to a flexible drive member, such as a belt or a chain 70 via a chain ring(s), or sprocket(s) 72. Rotation of chain 70 communicates a drive force to the rear section of bicycle 10. A cassette or gear cluster 74 is positioned at rear section and cooperates with chain 70. Gear cluster 74 is generally concentrically orientated with respect to axis 62 and preferably includes a number of variable diameter gears. It is appreciated that each of crankset 66 and gear cluster 74 can each be provided with one or more variable diameter gears to facilitate shifting of the power train during use of bicycle 10 so as to alter a pedal force and cadence associated with operation of bicycle 10.

Gear cluster 74 is operationally connected to rear hub assembly 14 of rear wheel assembly 64. A number of spokes 76 extend radially between hub assembly 14 and a rim 78 of rear wheel assembly 64. A rear tire 80 is concentrically positioned at a radial outward facing side of rim 78 and is constructed to interact with a riding surface 82. As is commonly understood, rider operation of pedals 68 drives chain 70 thereby driving rear wheel assembly 64 which in turn propels bicycle 10 via the interaction of rear tire 80 with surface 82. It is appreciated that the foregoing description of bicycle 10 is merely exemplary of a bicycle for use with the present invention. It is appreciated that bicycle 10 could be provided in any of a number of configurations including those configurations commonly referred to as street bikes, off-road or mountain bikes, hybrids of these types of bicycles, or other pedal driven vehicle configurations. It is further appreciated that, although the forthcoming description includes disclosure directed to the internal construction of front hub assembly 12, the internal construction of rear hub assembly 14 operates and/or is constructed in a manner similar to front hub assembly 12 unless otherwise noted.

As used herein and as commonly understood in the art, front hub assembly 12 is that portion of front wheel assembly 40 that excludes spokes 46, rim 48, and tire 50 and a securing mechanism that interacts with a respective structure of the front hub assembly 12 and corresponding structure of bicycle 10, such as fork tips 42, 44 so as to secure front hub assembly 12 for rotational operation relative to an underlying bicycle frame 18. Similarly, rear hub assembly 14 forms a portion of rear wheel assembly 64 that does not include spokes 76, rim 78, rear tire 80, and a securing mechanism that interacts with a respective structure of hub assembly 12 and corresponding structure of bicycle 10, such as seat stay 54, 56 and chain stays 58, 60, to secure hub assembly 12 for rotational operation relative to the underlying bicycle frame 18.

Although gear cluster 74 is secured to rear hub assembly 14 so that forward operation of pedals 68 effectuates forward rotation of rear hub assembly 14 which is imparted to rear rim 78 and rear tire 80 via spokes 76, gear cluster 74 is commonly consider a subassembly associated with a drive train of bicycle 10. Said in another way, front hub assembly 12 and rear hub assembly 14 include those portions of front wheel assembly 40 and rear wheel assembly 64 that are radially inboard of the respective spokes 46, 76 and that allow the hub assembly 12, 14 to cooperate with frame 18 to orient the respective hub assembly 12, 14 relative thereto.

Figure 2:
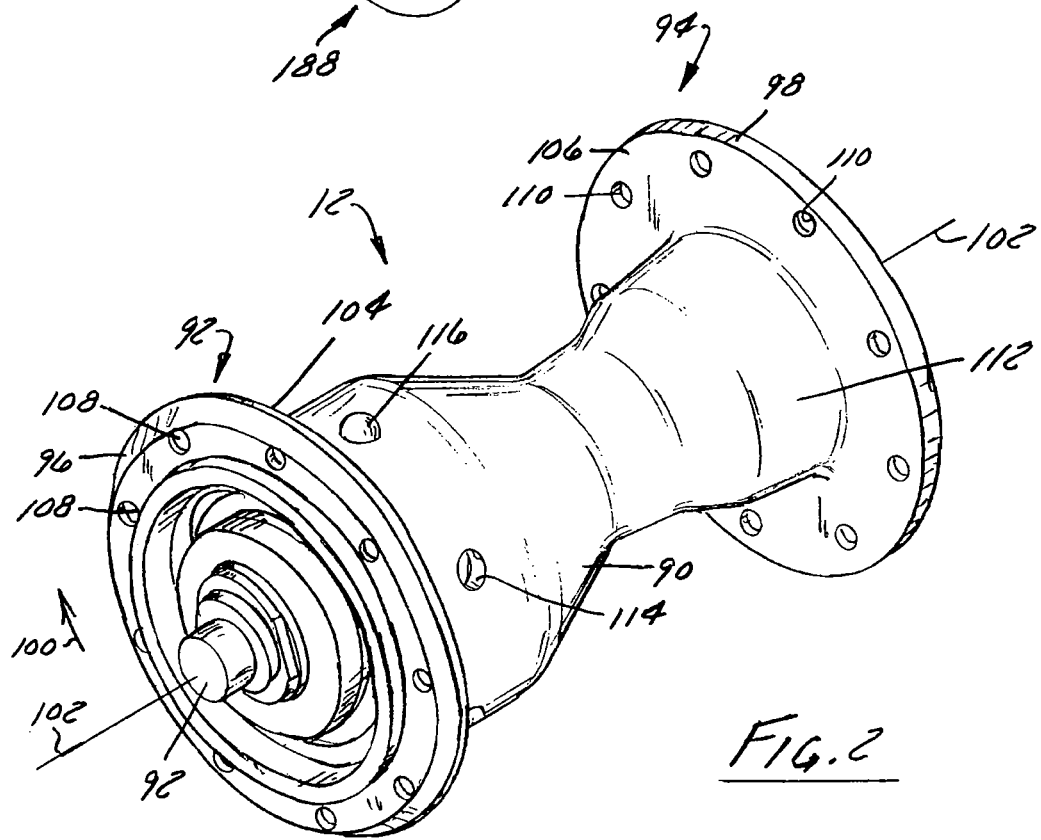
FIG. 2 is a perspective view of the front wheel hub assembly shown in FIG. 1 removed from the underlying bicycle.

FIGS. 2-4 show various views of front hub assembly 12. Front hub assembly 12 includes a hollow hub shell or simply a hub shell 90; a skewer, axel rod, or axle 92, and a light system 94 that is integral therewith. As shown in FIG. 2, hub shell 90 includes a first end 91 and a second end 93 with respect to a longitudinal shape of the hub shell 90. A pair of spokes flange 96, 98 extend in an outward radial direction, indicated by arrow 100, relative to a longitudinal axis, indicated by line 102, of hub shell 90. Axis 102 is aligned with the longitudinal centerline of axle 92 such that hub shell 90 is generally concentrically positioned thereabout.

Each spoke flange 96, 98 includes a wall 104, 106 having a number of spoke openings 108, 110 formed therethrough in a direction that is generally tangentially aligned with the longitudinal axis 102 of hub shell 90. Hub shell 90 includes a longitudinal body 112 that extends along axis 102 generally between spoke flanges 96, 98. Body 112 includes a number of perforations, hole, or openings 114 that are shaped to accommodate a light device, a lighting device or element, or discrete lighting devices, or simply lights 116. Preferably, each lighting device is further defined as a light emitting diode (LED), and is oriented to be visible from exterior locations relative to body 112 of hub shell 90.

As shown in FIG. 3, body 112 of hub shell 90 includes a radially directed inner surface 120 and an outward directed radial surface 122. Inner surface 120 generally faces an exterior surface 124 of axle 92 and outward directed radial surface 122 generally faces atmosphere. A gap, space, or cavity 126 is defined between inner surface 120 of hub shell 90 and exterior surface 124 of axle 92. A first bearing 128 and a second bearing 130 rotationally support generally opposite ends 91, 93 of hub shell 90 relative to axle 92.

Axle 92 has a longitudinal length, indicated by line 134, and cooperates with a first retention device or stop 136, such as a nut assembly, that is engaged with first end 138 of axle 92 and another retention device, such as a quick release assembly 140, engaged with the second end 142 of axle 92. Stop 136 and quick release assembly 140 cooperates with ends 138, 142 of axle 92 at positions laterally outboard, indicated by arrows 144, 146, of one of respective fork tips 42, 44.

As is commonly understood, operator manipulation of a handle 150 of quick release assembly 140 manipulates the position of a respective inboard facing side 152, 154 of stop 136 and quick release assembly 140 so as to allow removal or disengagement of axle 92 and hub assembly 12 from the underlying bicycle 10 when handle 150 is "Opened." When "Closed", handle 150 manipulates the distance between sides 152, 154 of stop 136 and quick release assembly 140 such that wheel assembly 40, including hub assembly 12, can be slidably disengaged from bicycle 10. It is appreciated that wheel assembly 40 can be secured to bicycle 10 with other less readily operable securing and release assemblies. For instance, both ends of axle 92 could be configured for cooperation with nut assemblies that would commonly require access to tools for manipulation of the inaction of the wheel assembly with the underlying bicycle.

Still referring to FIG. 3, an optional spacer, bushing, or dust cap 160, 162 is disposed at each of the opposite ends of hub assembly 12 and positioned laterally inboard, indicated by arrows 164, 166, of the respective fork tip 42, 44. Each dust cap 160, 162 cooperates with a pocket 168, 171 formed at opposite longitudinal ends of hub shell 90 so as to limit the ability of fluid, dirt, or debris from entering cavity 126 of hub shell 90.

Lighting system 94 includes a power and illumination devices, as well as an optional control system, that are each positioned laterally inboard 164, 166 of the opposite lateral ends 91, 93 of hub shell 90. Referring to FIGS. 3 and 4, lighting system 94 includes a magnet 170 that is positionally fixed with respect to axle 92 and a coil 172 that is positionally fixed with respect to hub shell 90. Magnet 170 and coil 172 are positionally associated with one another such that rotation of hub shell 90 relative to axle 92 induces an electrical current in coil 172 via rotation movement relative to magnet 170. Magnet 170 preferably includes a number of alternating opposed magnets so that as the coil passes each magnet an alternating current is induced in the coil. The speed at which the coil passes the respective magnets determines the voltage associated with the resultant alternative current field. It is appreciated that the position of magnet 170 and coil 172 could be reversed with respect to axle 92 and hub body 112 with the inclusion of a rotatable electrical contact system, such as a brush system, common to motor technologies.

As is commonly understood, during operation of bicycle 10, hub shell 90, spokes 46, and rim 48 rotate concentrically about axle 92. Such relative movement generates relative rotational movement between magnet 170 and coil 172 thereby inducing an electrical current in coil 172. At least one, and preferably a plurality of light or illumination devices or simply lights 116 are electrically connected to coil 172 such that the current induced in coil 172, via the rotation relative to magnet 170, powers lights 116. Preferably, the light emitting diodes are alternately arranged so that as current passes in one direction, past one pole of a respective magnet, a diode of the control circuit conducts through half of the total number of LED's and as current passes in the other direction, on the other pole of a respective magnet, current passes through the remaining number of the LED's. Such a configuration results in LED's that alternately turn "On" and "Off" with each successive passing of a respective magnet, once a threshold of wheel speed is achieved. The size of the LED, coil ring, and magnets are optimized for bicycle wheel speeds and provide a fairly continuous illumination event at such speeds.

As explained further below, an optional control system 174 can also be electrically connected to coil 172 and lights 116 so as to manipulate the illumination performance of lights 116 during rotation of hub shell 90 and/or during periods of limited, slower, or no motion of hub shell 90 relative to axle 92. Control system 174 is envisioned to include one or more printed circuited boards (PCB's) that electrically connect one or more electrical devices that are powered by the magnet and coil pair and control operation of the one or lights powered thereby.

Each light 116 includes a pair of wires 176, 177 that are operationally connected to coil 172 and physically isolated from magnet 178. Each light 116 can include an optional a lens 181 that extends through, and is visible beyond, body 112 of hub shell 90. Lens 181 can be provided in as a diffuser or a color filter intended to display a particular color from an LED having a particular color associated with its operation. Preferably, each light 116, and/or the optional lens when provided, is sealed in a respective opening 114 formed in body 112 of hub shell 90. Preferably, lights 116 are also offset laterally relative to the plane of rotation of rim 48 so as to improve the visibility of lights 116 during rotation of the corresponding wheel from a forward location aligned with the direction of travel of bicycle 10. It is appreciated that facing respective lights in more lateral directions detracts from the forward directed illumination performance of the same but improves lateral visibility of the respective wheel assembly.

Figure 5:
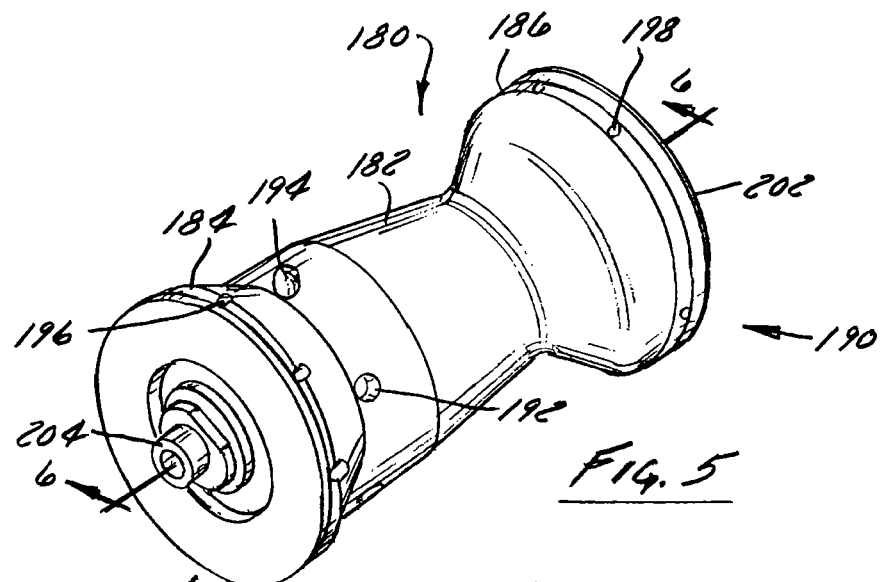
FIG. 5 is a perspective view of lighted hub assembly according to another embodiment of the present invention.
Figure 6:
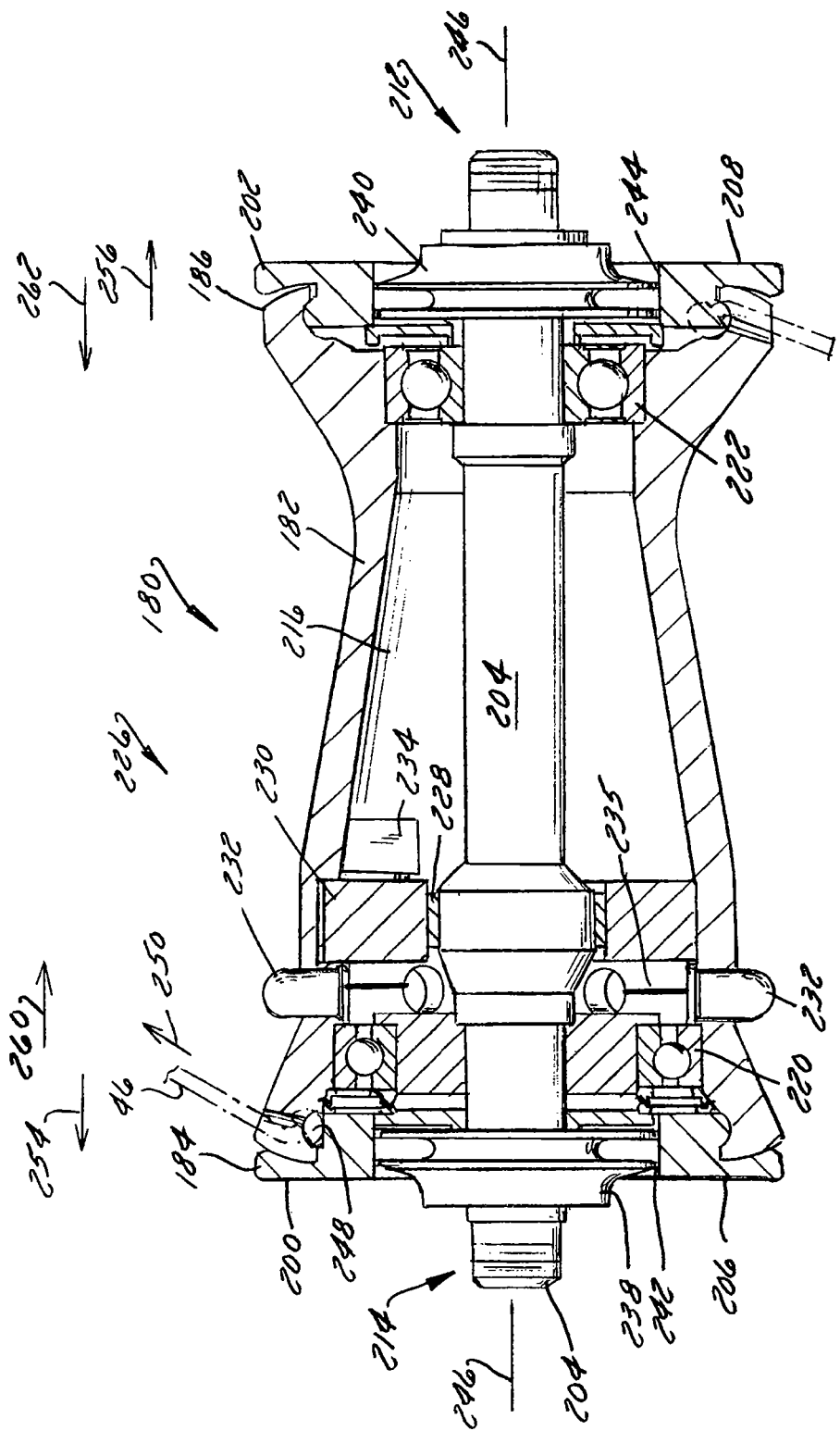
FIG. 6 is an elevational cross-section view of the hub assembly shown in FIG. 5 taken along line 6-6.

FIGS. 5 and 6 show a hub assembly 180 according to another embodiment of the present invention. Hub assembly 180 includes a hub shell 182 having a first spoke flange 184 and a second spoke flange 186 that are oriented at opposite ends 188, 190 of hub shell 182. Hub shell 182 includes a number of openings 192 that are each constructed to receive a respective light 194 that is supported by hub shell 182.

A number of blind passages or spoke openings 196, 198 are formed in the circumferential perimeter of spoke flanges 184, 186. A first disc 200 cooperates with first end 188 of hub shell 182 and a second disc 202 cooperates with a second end 190 of hub shell 182. A skewer, axle rod, or axle 204 passes through hub shell 182. Discs 200, 202 are positioned adjacent the alternate outboard lateral edges 206, 208 of hub shell 182 and capture the respective spokes relative thereto. Axle 204 includes a first end 212 and a second end 214 that are constructed to cooperate with corresponding portions of bicycle 10 and corresponding retention devices, such as stop 136 and/or a quick release assembly 140 like those described above.

As shown in FIG. 6, hub shell 182 and axle 204 define a cavity 216 that extends therebetween along the longitudinal length of the hub assembly. A first bearing 220 and the second bearing 222 rotationally support the alternate ends of hub shell 182 relative to axle 204. A lighting system 226 is positioned laterally inboard or between spoke flanges 184, 186 of hub shell 182. Lighting system 226 includes a magnet 228, a coil 230, and one or more discrete light devices, light elements, or simply lights 232 that extend through hub shell 182 and are visible from positions external thereto.

A number of wires 235 extend from each light 232 and are operationally connected to coil 230 in a manner similar to that described above. An optional control 236 can also be connected to coil 230 and/or light 232 so as to manipulate the operating performance of lights 232. As described further below with respect to FIG. 11, optional control system 234 is preferably attached to a hub assembly 180 so as to be positionally fixed with respect to coil 230 and lights 232.

An optional dust cap 238, 240 cooperates with the alternate longitudinal ends of hub assembly 180 and frictionally cooperates with a cavity 242, 244 formed in a respective disc 200, 202. Discs 200, 202 extend in an outward radial direction relative to the longitudinal axis, indicated by line 246, of axle 204 so as to generally overlie the respective spoke flange 184, 186.

Spokes 46 include a head portion 248 that is sized so as to prevent passage of the head portion 248 of each respective spoke 46 in an outward radial direction, indicated by line 250, through the respective spoke opening 196, 198 associated with the respective spoke flange 184, 186. Discs 200, 202 generally overlie the respective spoke flange 184, 186 and prevent lateral translation, indicated by arrows 254, 256 of spokes 46 relative to the respective spoke flange 184, 186.

Like hub assembly 12, lighting system 226 of hub assembly 180 is positioned laterally inboard, indicated by arrows 260, 262 relative to each respective spoke flange 184, 186. Lighting system 226 is fully supported by hub assembly 180 and independently powered by rotation of hub shell 182 relative to axle 204 thereby providing a lighted bicycle wheel hub assembly having a relatively compact configuration and robust construction with no mechanical and/or electrical connections extending between the relatively rotatable portions of the hub assembly 180.

Figure 7:
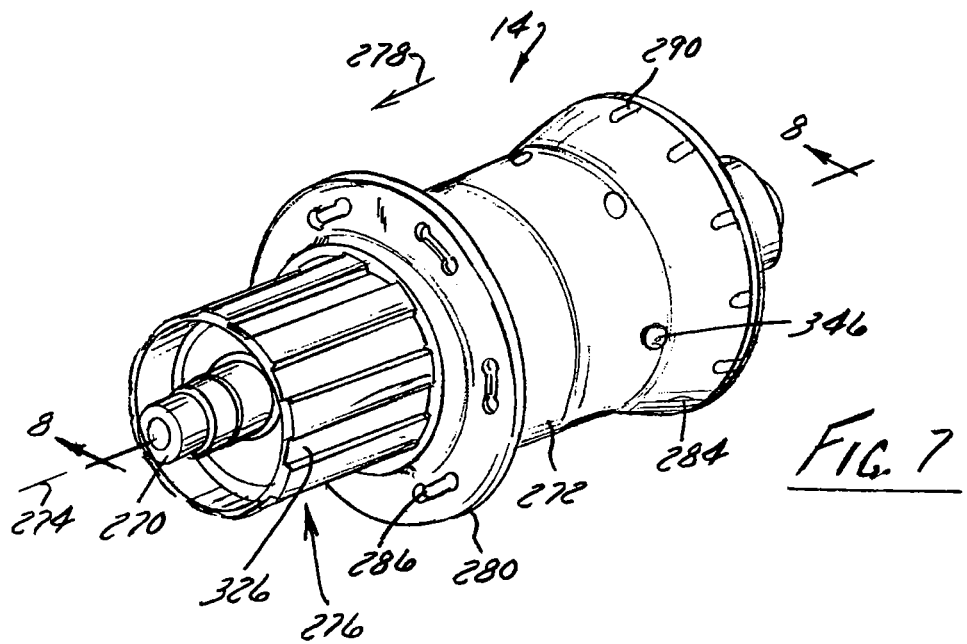
FIG. 7 is a perspective view of a lighted rear wheel hub assembly of the bicycle shown in FIG. 1.

FIGS. 7 and 8 show rear hub assembly 14 removed from bicycle 10. Rear hub assembly 14 includes a skewer, axel rod, or axle 270 that is concentrically positioned relative to a hub shell 272. Axle 270 has a longitudinal length that extends along a longitudinal centerline 274 of axle 270 and that is sufficient to support hub shell 272, a plurality of gears, a cassette, or cassette mount assembly 276, and accommodate connection of hub assembly 14 relative to a bicycle 10. Cassette mount assembly 276 is positioned concentrically about axis 274 of axle 270 and laterally outboard, indicated by arrow 278, relative to a first spoke flange 280 of hub shell 272. As is commonly understood, cassette mount assembly 276 facilitates the multi-gearing of rear wheel assembly 64 as well as free-wheeling and/or fixed gearing of rear wheel assembly 64.

Second spoke flange 284 is positioned at the generally opposite longitudinal end of hub shell 272 relative to cassette mount assembly 276. Spoke flange 280 includes a number of openings 286 that are oriented circumferentially about spoke flange 280 and each or which slidably cooperate with a respective spoke 76 that extends between hub shell 272 and a rim 78 of rear wheel assembly 64. Second spoke flange 284 includes a number of openings or slots 290 that are shaped to slidably cooperate with a spoke such that a head portion 292 of the respective spoke 76 is captured toward an internal surface 294 of hub shell 272. A disc 298 slidably cooperates with axle 270 and extends in an outward radial direction, indicated by line 300, and generally radially overlaps spoke flange 284 such that the one or more spokes 76 engaged with slots 290 are captured by hub shell 272.

A first bearing 304 and the second bearing 306 are rotatably disposed between hub shell 272 and axle 270 such that hub shell 272, spokes 76, and rim 78 of rear wheel assembly 64 are rotationally connected to axle 270 even though axle 270 is positionally fixed when secured to bicycle 10.

Cassette mount assembly 276 includes one or more bearings 308, 310 that rotationally connect a sleeve 312 relative to axle 270. One or more variable diameter gears 314, 316, 318, 320, 322 are connected to one another and/or supported by a sleeve 324 that slidably cooperates with a splined interface 326 formed on a radially exterior surface of sleeve 312. Preferably, sleeves 312, 324 and gears 314-322 are connected to axle 270 in a selectively engageable or clutched manner such that forward operation of pedals 68 communicates a forward drive force to hub shell 272 and whereas rearward rotation or stationery orientation of pedals 68 selectively decouples cassette mount assembly 276 from a driving rotational interaction with hub shell 272 of hub assembly 14.

Alternate ends 330, 332 of axle 270 are constructed to cooperate with retention mechanisms such as stop 136 and/or a quick release assembly 140 similar to those described above so as to secure hub assembly 14 for rotational interaction with bicycle 10. As shown in FIG. 8, hub shell 272 includes a radially inward facing surface 334 that is directed toward a radially outward facing surface 336 of axle 270. Surface 334 of hub shell 272 and surface 336 of axle 270 cooperate to define a space, gap, or cavity 340 between hub shell 272 and axle 270.

A light system 342 is disposed in cavity 340 and includes a number of light emitting devices (LED's) or light elements, or simply lights 346 that are operationally connected to a coil 348. Coil 348 is affixed a hub shell 272 such that rotation of hub shell 272 imparts a rotational movement to coil 348 relative to axle 270. A magnet 350 is secured to a radially exterior directed surface 336 of axle 270 and maintains a relative position with respect to axle 270 during operation of bicycle 10 during rotational movement of hub shell 272 and rotation of rear wheel assembly 64. Such a configuration allows magnet 350 to induce a current in coil 348 during operation of bicycle 10.

An optional control system 356 is also operatively connected to coil 348 such that an electrical signal induced in coil 348 via the rotational interaction with magnet 350 powers control system 356. As explained further below with respect to FIG. 11, control system 356 is preferably configured to allow a user to manipulate the operating performance of lights 346 aside from a normal operation associated with the rotational interaction between hub shell 272 and axle 270.

Figure 9:
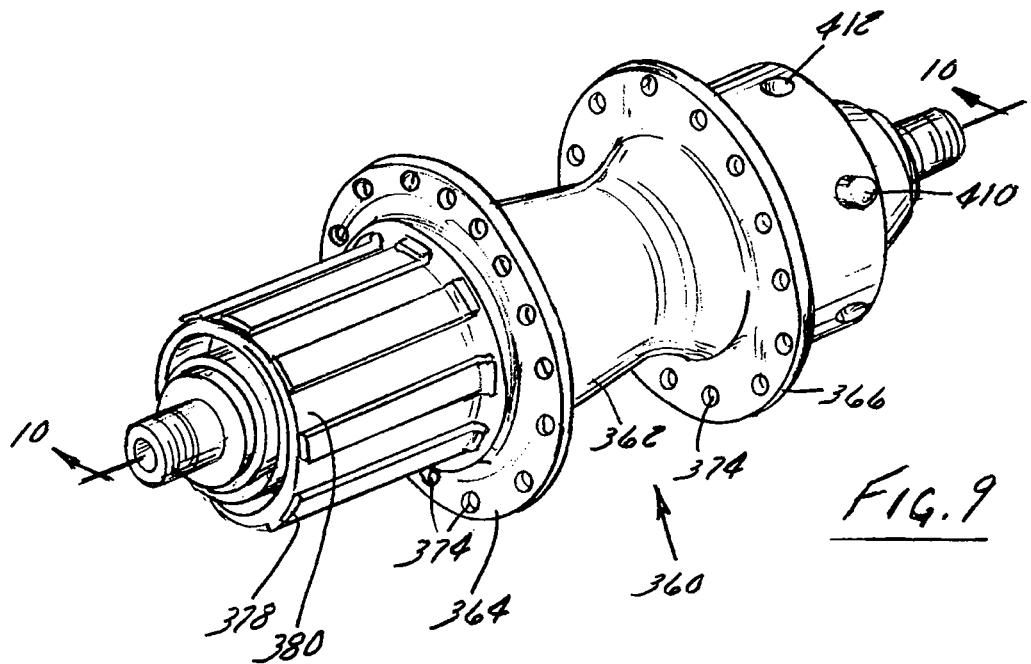
FIG. 9 is a perspective view of a lighted rear wheel hub assembly useable with the bicycle shown in FIG. 1 and according to another embodiment of the present invention.
Figure 10:
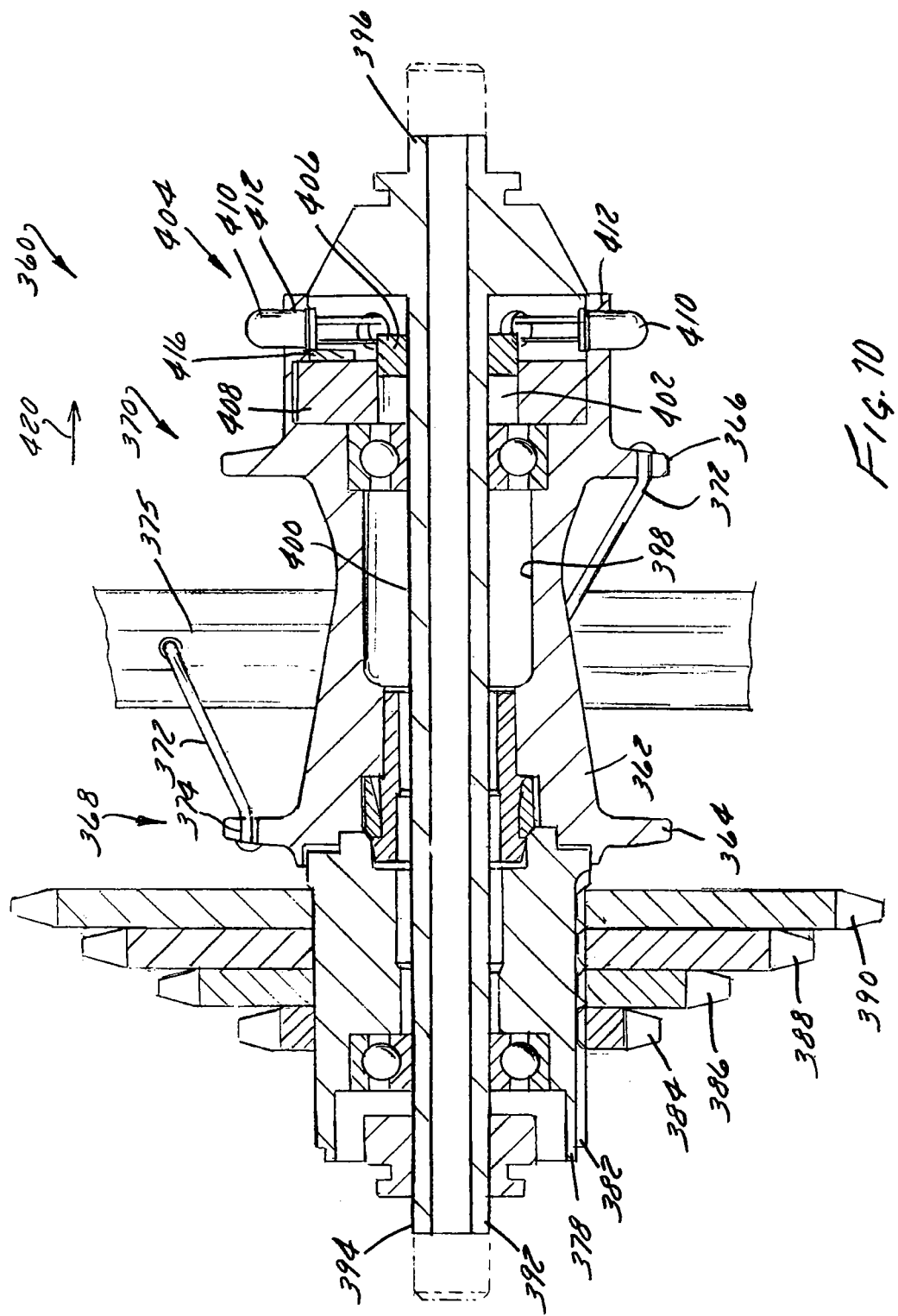
FIG. 10 is a elevational cross-section view of the hub assembly shown in FIG. 9 taken along line 9-9.

FIGS. 9 and 10 show a lighted rear wheel hub assembly or rear wheel hub assembly 360 according to another embodiment of the present invention. Hub assembly 360 includes a hub shell 362 that includes a first spoke flange 364 and a second spoke flange 366 that are offset laterally along a longitudinal length relative to a first end 368 and a second and 370 of hub shell 362. A number of spokes 372 slidably cooperate with a respective opening 374 associated with a respective spoke flange 364, 366. Each spoke 372 extends in an outward radial direction relative to hub shell 362 and engages a rim 375 associated with the respective wheel assembly.

Like hub assembly 14, hub assembly 360 includes a cassette mount 378 having a splined interface 380 that is adapted to slidably cooperate with a cassette 382 having a number of variable diameter gears 384, 386, 388, 390 that are adapted to communicate a driving force to hub assembly 360. Hub assembly 360 includes an axle 392 having a first end 394 and a second and 396 that extend beyond the opposite ends of hub shell 362 and cassette 382 and are shaped to removably cooperate with rear wheel bicycle support structures such as one or more seat stays 54, 56 and chain stays 58, 60.

Also like hub assembly 14, hub shell 362 of rear hub assembly 360 includes an interior facing wall 398 that faces toward a radially exterior facing surface 400 of axle 392 so as to define a gap, space, or cavity 402 therebetween. Hub assembly 360 includes a lighting system 404 having a magnet 406 that is affixed to axle 392, a coil 408 that is affixed a hub shell 362, and one or more lights sources, illumination sources, luminaries, light devices, or simply lights 410 that cooperate with a respective hole 412 formed through hub shell 362 such that each light device or lights 410 is visible from locations external to hub shell 362.

Each light 410 is operationally connected to coil 408 such that rotation of hub shell 362 relative to axle 392 powers each light 410 of light system 404. An optional control system 416 is also connected to coil 408 and each light 410 so as to selectively manipulate the operation of lights 410 as described further below with respect to FIG. 11. As compared to hub assembly 14, it should be noted that lights 410 of light system 404 of hub assembly 360 are positioned laterally outboard, as indicated by arrow 420, relative to spoke flange 366 whereas lights 346 are positioned laterally inboard relative to spoke flange 284 of hub assembly 14. It is further appreciated that although lights 410 are positioned at what is commonly referred to a non-drive lateral outboard side of the hub assembly, lights 410 could be configured and/or oriented so as to shine through the gear set associated with the drive or driven side of the rear wheel hub assembly. It is further appreciated that either of front wheel hub assemblies 12, 180 could be provided with laterally outboard oriented lights relative to the respective spoke flanges of the respective hub assembly.

It is appreciated that one or more of hub assemblies 12, 14, 180, and 360 can be provided with one or more lights positioned on opposite adjacent sides of a respective spoke flange. It is further appreciated one or more of hub assemblies 12, 14, 180, 360 can be provided with one or more magnet and coil pairs for powering such circumferentially oriented discrete light elements. Alternatively, it is appreciated that the each of the respective lights can be connected to a single coil provided the respective coil and magnet pair induces a current as various operating speeds sufficient to achieve a tolerable lighting performance of the respective lighted hub assembly.

Figure 11:
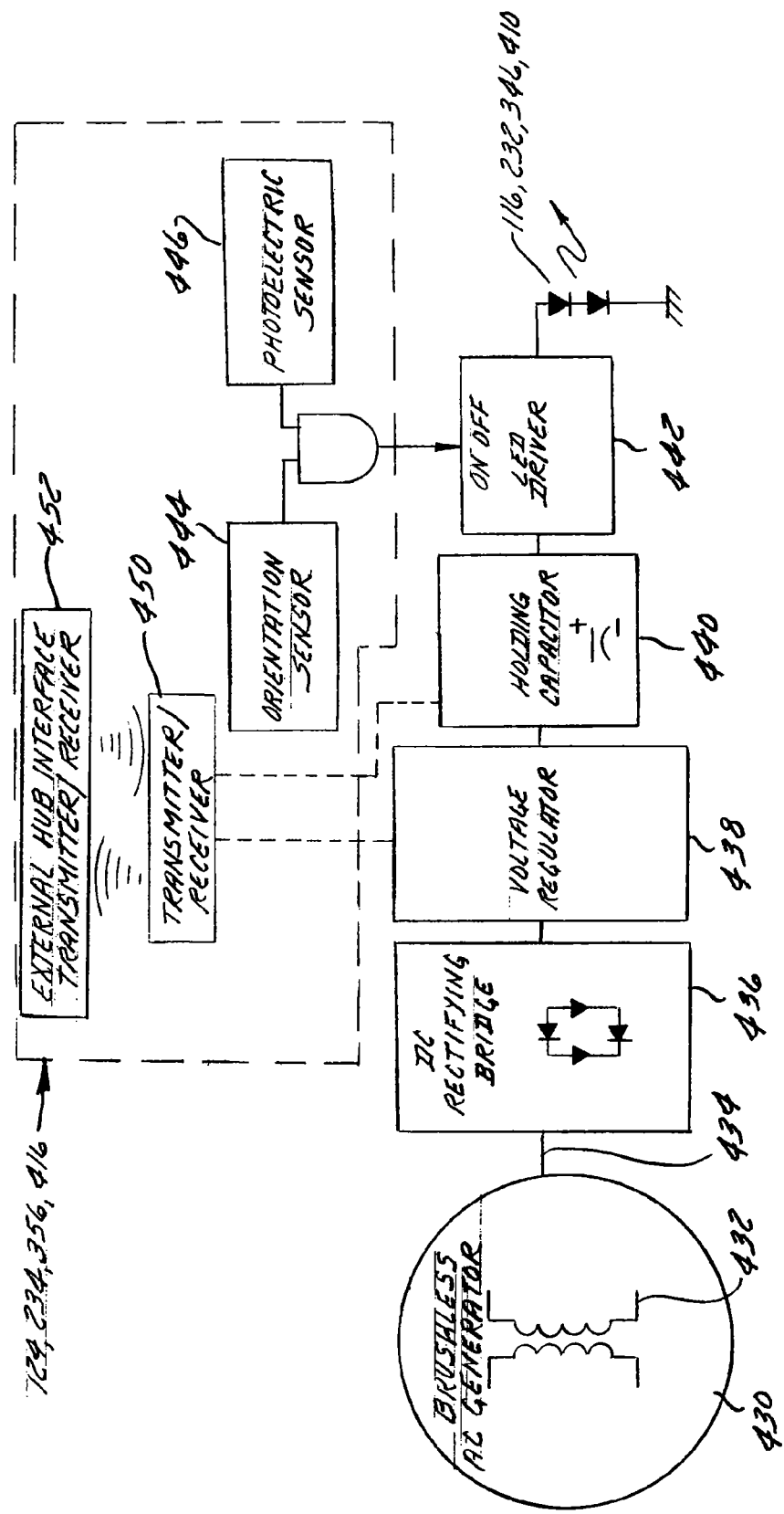
FIG. 11 is an exemplary circuit diagram associated with operation of one or more of the hub assemblies shown in FIGS. 2-10.

FIG. 11 shows an exemplary control, controller, control circuit, or control system 174, 234, 356 or 416 associated with the operation of one or more of lighted hub assemblies 12, 14, 180, 360. In its simplest form, each lighting system of a discrete hub assembly includes a brushless AC generator 430 that includes the magnet and the coil of the respective hub assembly as discussed above. An electrical signal 432 induced in the coil by the magnet is output 434 to a DC rectifying bridge 436 that converts the AC signal generated by the coil/magnet pair to a direct current suitable for powering the lighting devices.

A voltage regulator 438 regulates the direct current signal suitable for powering the light devices. An optional holding capacitor 440 provides a reserve electrical signal associated with operation of the respective lighting device for limited durations during slow or no rotational movement of the respective hub shell relative to the underlying axle. Preferably, capacitor 440 is configured to allow sustained operation of the LED's of a respective lighted hub assembly for a duration of approximately 90 seconds after rotation of a respective wheel assembly has stopped. An LED driver 442 communicates a signal from DC regulator and/or the optional holding capacitor to the respective LED's or lights 116, 232, 346, 410 of the respective hub assembly. It is further appreciated that drive 442 could be configured so as to include a timer to effectuate a flashing operation of the respective discrete LED's. Preferably, the respective lighted hub assembly includes an optional orientation sensor 444 and or an optional photoelectric sensor 446 that communicate the desired output signal to LED driver 442 if prescribed conditions are satisfied.

Orientation sensor 444 limits operation of one or more of discrete lights 116, 232, 346, 410 as a function of the relative rotational orientation of the respective hub shell relative to the bicycle frame and the rider seated thereupon. Referring back to FIG. 1, sensor 444 is preferably configured to limit or suspend operation of discrete light elements when the discrete light elements are oriented in a rotational arc wherein they are generally directed toward the rider, and more specifically toward the face of the rider, of bicycle 10. This arc is indicated in FIG. 1 by line 460 wherein the rays that define the bounds of the arc originate from the longitudinal centerline of the respective axle associated with front wheel assembly 40. It is appreciated that lighted rear wheel assemblies would not need such functionality as the light emitted from the light sources associated therewith would not commonly be directed toward the face of the rider and/or would be obstructed from reaching the rider's eyes via other structures of bicycle 10 and/or the body of the rider.

Optional photoelectric sensor 446 limits operation of the discrete lighting elements or lights 116, 232, 346, 410 as a function of ambient lighting conditions. That is, whereas the visibility of the rider and the visibility of the rider to third parties is not customarily a problem during daylight hours, sensor 446 allows suspension of the operation of respective lighting system when ambient lighting conditions are sufficient for rider visibility for bicycle operation and third party identification of a bicyclist.

Optional control system 174, 234, 356, 416 can also include a first transmitter and/or receiver 450 that is preferably internal to the respective hub shell and an external hub interface transmitter receiver 452 that is external to the respective hub assembly. Preferably, transmitter/receiver 452 is also remote from the underlying wheel assembly. Transmitter/receiver pairs 450, 452 are configured to communicate with one another so as to allow a user to individualize the operation of the respective control system associated with each of the forward and rearward wheel of a respective bicycle. Preferably, external hub interface 452 is integrated into a bicycle computer or other personal data device capable of wirelessly transmitting and receiving information from internal hub transmitter/receiver 450.

During testing of various lighted wheel hub assemblies according to one or more of the various embodiments disclosed herein, various parameters associated with a desired illumination and/or visual inspection of the lighted wheel assemblies were determined. Based on the visual inspections associated with various of the lighted hub assemblies disclosed herein, the hub power output needs to preferably be approximately 75 mW at 3V with an average of preferably 35 to 40 mW if the lights are configured to blink on and off during rotation of the wheel assembly. With respect to the front wheel hub assemblies, at rotational speeds of approximately 10 mph, the light systems of the hub assemblies operate at an average voltage is 2.07V at 5 mW. Such a configuration results in the lights being on or illuminated approximately 23% of the time wherein the lights consume 22 mW power. At peak wheel operation at this speed, the hub produces 2.96V and 15 mA. With respect to the rear wheel assemblies operating at the same speed, the average voltage is 1.50V at 5 mW. Such a configuration results in the lights being on or illuminated approximately 30% of the time and during which they are collectively consuming 21 mW power. At the same operating speed, the lighted rear wheel hubs produce approximately 1.92V and 12 mA. Understandably, most conditioned riders are capable of extended periods of operation of a bicycle and at greater speeds that those indicated above. It is appreciated that the power and consumption characteristics of the various lighted hub assemblies can be tailored to accommodate such rider characteristics and/or to further augment the lighting characteristics achievable therewith.

It is envisioned that each of lighted hub assemblies 12, 14, 180, 360 includes a number of discretely operable LED's that are oriented at various locations, various radially directed orientations, and various laterally directed orientations with respect the plane of rotation of the associated respective wheel assembly. That is, the LED's can be positioned to face alternate lateral sides of the bicycle and canted to the face in tangential directions within the plane of rotation of the respective LED. Preferably, one or more of the LED's are oriented to face an at least partly lateral direction with respect to the plane of rotation of the underlying wheel assembly. Said in another way, one or more of the various LED's are oriented to point in a partly laterally outward direction with respect to the plane of rotation of the wheel and the position of the respective LED. Such an orientation improves the lateral visibility of the bicycle so equipped. Such an orientation also improves the detrimental effects associated with directing the lighting elements in the direction of the face of the rider. Lights positioned nearer the centerline of the bicycle wheel assembly reflected greater off the rim thereby increasing the illumination of the entire wheel.

It is further appreciated that placing more LED's about the circumference of the hub can tend to allow the lighting system to appear as one band of light of fairly uniform illumination during rotation of the respective hub assembly at even slower than normal operating speeds. Even so, the nearly fully enclosed lighting system of the various lighted hub assemblies provides a bicycle light system that is unobtrusive and nearly imperceptible until use or illumination of the various light elements associated therewith. Furthermore, the internal positioning of near the entirety of the light system provides improved drag performance of the underlying bicycle in as much as the lighting system is provided in a necessary rather than supplemental structure relative to the underlying bicycle.

It is further appreciated that the type or color of the LED's of the respective hub assembly and/or a lens associated therewith can be manipulated to manipulate the lighting performance of the respective hub assemblies. That is, it is envisioned that the front wheel hub assemblies can be equipped with white light LED's and/or lens and the rear wheel hub assemblies can be equipped with LED's having different colors and/or lens colors such that the illumination color associated with a given hub assembly can give an indication of the direction of travel of a bicycle so equipped—such as red light LED's or white light LED's with a red lens for those hub assemblies wherein the hub assembly is associated with a rear wheel assembly of an underlying bicycle. Preferably, the front wheel hub assemblies include at least six clear white LED's. More preferably, the six LED's alternate about the circumference of the wheel to be oriented axially and oriented in a crossing direction relative to the axial direction. Alternatively, the front wheel hub assemblies can be provided with two diffuse white LED's or two clear white LED's oriented at approximately 45 degrees in opposite directions relative to the plane of rotation of the corresponding wheel assembly. Such a configuration has shown to provide good visibility from and of the bicycle relative to the yaw angles relative to a forward direction of travel of the bicycle.

With respect to rear wheel hub assemblies, various configurations are also envisioned and include configurations having two red LED's with white lenses when observed from a viewing angle of eight degrees, six red LED's with clear white lenses and various other viewing angles, and two red LED's with diffuse red lenses and a positioned at a viewing angle of 60 degrees have shown to provide adequate forward, rearward, and lateral visual assessment and illumination of a rear wheel lighted hub assembly of a respective bicycle. It is appreciated that the front wheel lighted hub and the rear wheel lighted hub can be provided on a common bicycle and can be configured to provide a common appearance during use and/or provide different lighting performance. Said in another way, it is envisioned that the front wheel hub assembly operate according to a front wheel lighting schedule and the rear wheel hub assembly operate according to a rear wheel lighting schedule that is the same or different than the front wheel lighting schedule. If different, it is envisioned that any of the color of the lights and/or lens, the duration and/or pattern of operation of the lights, or the lighting intensity be manipulated to provide preferred forward and rear wheel lighting characteristics.

Therefore, one embodiment of the invention includes a bicycle wheel hub assembly that includes a number of light emitting diodes (LED's) that are powered by rotation of the wheel during use of the bicycle. The hub assembly includes a magnet and a coil that are both internal to the hub. The LED's are supported by the hub and rotate with the hub during rotation of the bicycle wheel assembly such that the entirety of the physically connected components of the lighting system is supported by the wheel assembly.

Preferably, the light emitting diodes are powered by current induced in the coil and controlled so as to prevent illumination of discrete LED's when the respective LED's are directed toward a user's eyes during rotation of the hub. The LED's can be attached to the hub at locations that are both laterally inboard and laterally outboard of a respective spoke flange. Said in another way, the LED's are connected to the hub so as to be on opposite lateral sides of a single spoke flange of the hub assembly. Preferably, both the front and rear wheels of a bicycle are equipped with lighted hub assemblies that each includes one or more discrete light elements that rotate with the corresponding wheel assembly during use of the bicycle.

Another embodiment of the invention that includes one or more features that can be combined with one or more of the features of the above embodiment includes a bicycle wheel hub assembly that includes a skewer, a hub shell, and at least one opening formed in the hub shell. The skewer has a length that extends along a longitudinal axis of the skewer between a first end and a second end of the skewer such that the first end of the skewer removably cooperates with a first bicycle wheel support and the second end of the skewer removably cooperates with a second bicycle wheel support. The hub shell is positioned concentrically about the skewer to define a space between an outer radial surface of the skewer and an inner radial surface of the hub shell. A magnet is attached to one of the skewer and the hub shell and a coil is attached to the other of the skewer and the hub shell. The magnet and coil are oriented along the longitudinal axis of the skewer so that the magnet and coil are in proximity to one another such that rotation of the hub assembly induces a current in the coil. At least one luminary, such as a light emitting diode (LED), is supported by the hub shell and secured in the at least one opening of the hub shell. The at least one luminary is powered by relative rotation between the coil and the magnet. A control is configured to prevent operation of the at least one luminary for a portion of a rotational travel path of the at least one luminary when the luminary is rotationally oriented to generally face a rider of a bicycle during rotation of the hub shell.

Another embodiment of the invention that is useable or combinable with one or more of the features of the above embodiment includes a bicycle assembly having a frame that is adapted to support a rider. A handlebar is pivotably attached to the frame. The bicycle assembly includes a front wheel assembly and a rear wheel assembly. The front wheel assembly includes a front wheel hub, an axle that passes through the front wheel hub and extends beyond the front wheel hub to rotatably cooperate with the frame. A magnet and a coil are positioned between the front wheel hub and the axle and oriented so that relative rotation between the front wheel hub and the axle induces an electrical signal in the coil. A plurality of front wheel light emitting diodes (LED's) is operatively connected to the coil so that the electrical signal generated in the coil selectively powers the plurality of front wheel light emitting diodes.

The rear wheel assembly includes a rear wheel hub and a rear wheel axle that passes through the rear wheel hub and extends beyond the hub to rotatably cooperate with a chain stay and a seat stay of the frame. A rear magnet and a rear coil are positioned between the rear wheel hub and the rear wheel axle and are oriented so that relative rotation between the rear magnet and the rear coil induce an electrical signal in the rear coil. A plurality of rear wheel light emitting diodes (LED's) is operatively connected to the rear coil so that the electrical signal selectively powers the plurality of rear wheel light emitting diodes. The front wheel assembly and the rear wheel assembly are connected to the bicycle assembly so that the plurality of front wheel LED's are oriented and powered to illuminate in a front wheel lighting schedule and so that the plurality of rear wheel LED's are oriented and powered to illuminate in a rear wheel lighting schedule that is different than the front wheel lighting schedule.

Another embodiment of the invention that is useable or combinable with one or more of the features of the above embodiments includes a method of forming a lighted bicycle wheel assembly of a bicycle. One of a magnet and a coil is secured to an axle and the other of the magnet and the coil is secured to an inside of a hub. The axle and the hub are concentrically oriented relative to one another so that the magnet is positioned proximate the coil to induce a current in the coil during rotation of the hub relative to the axle. A lighting system is provided that includes electrically connecting a first LED and a second LED to the coil so the current in the coil powers the first LED and the second LED. The first LED and the second LED are secured to the hub in alignment with respective openings formed in the hub. Operation of the first LED and the second LED is controlled during use of the lighting system such that illumination of one of the first LED and the second LED is suspending when the one of the first LED and the second LED is directed toward at least a face of a rider and independent of operation of the other of the first LED and the second LED.

The present invention has been described above in terms of the preferred embodiment. It is recognized that various alternatives and modifications may be made to these embodiments which are within the scope of the appending claims.

What is claimed is:

1. A bicycle wheel hub assembly comprising:
   a skewer having a length that extends along a longitudinal axis of the skewer between a first end and a second end, wherein the first end of the skewer removably cooperates with a first bicycle wheel support and the second end of the skewer removably cooperates with a second bicycle wheel support;
   a hub shell positioned concentrically about the skewer to define a space between an outer radial surface of the skewer and an inner radial surface of the hub shell;
   at least one opening formed through the hub shell;
   a magnet attached to one of the skewer and the hub shell;
   a coil attached to the other of the skewer and the hub shell;
   the magnet and coil being oriented along the longitudinal axis of the skewer so that the magnet and coil are in proximity to one another such that rotation of the hub assembly induces a current in the coil;
   at least one luminary supported by the hub shell and secured in the at least one opening, the at least one luminary being powered by relative rotation between the coil and the magnet; and
   a control configured to prevent operation of the at least one luminary for a portion of a rotational travel path of the at least one luminary when the luminary is rotationally oriented to generally face a rider of a bicycle during rotation of the hub shell.

2. The assembly of claim 1 wherein the magnet and coil are concentrically positioned relative to one another along the longitudinal axis of the skewer.

3. The assembly of claim 2 wherein the magnet is secured to the outer radial surface of the skewer and the coil is secured to the inner radial surface of the hub shell.

4. The assembly of claim 3 wherein the at least one luminary extends through the hub shell.

5. The assembly of claim 4 wherein the at least one luminary is further defined as a first luminary and a second luminary that are offset from another along the hub shell in a direction aligned with the longitudinal axis of the skewer.

6. The assembly of claim 5 wherein the first luminary and the second luminary are separated by a single spoke flange of the hub shell.

7. The assembly of claim 4 wherein the hub shell further comprises a first spoke flange and a second spoke flange and wherein the at least one luminary extends through the hub shell at a position that is on a laterally outboard side of one of the first spoke flange and the second spoke flange.

8. The assembly of claim 1 wherein the hub shell further comprises a first spoke flange and a second spoke flange, each spoke flange extending in an outward radial direction relative to the longitudinal axis of the skewer and respectively proximate to a first end and a second end of the hub shell.

9. The assembly of claim 1 wherein the control is enclosed between the hub shell and the skewer.

10. The assembly of claim 1 wherein the hub shell and skewer are constructed to rotatably cooperate with at least one of a pair of chain stays and a pair of fork legs.

11. A bicycle assembly comprising:
   a frame adapted to support a rider;
   a handlebar pivotably attached to the frame;
   a front wheel assembly comprising:
      a front wheel hub;
      an axle passing through the front wheel hub and extending beyond the front wheel hub to rotatably cooperate with the frame;
      a magnet and a coil positioned between the front wheel hub and the axle and oriented so that relative rotation between the front wheel hub and the axle induces an electrical signal in the coil; and a plurality of front wheel light emitting diodes operatively connected to the coil so that the electrical signal selectively powers the plurality of front wheel light emitting diodes, wherein the plurality of front wheel light emitting diodes are nested in a plurality of openings of the front wheel hub; and a rear wheel assembly comprising:

a rear wheel hub;

a rear wheel axle passing through the rear wheel hub and extending beyond the hub to rotatably cooperate with a chain stay and a seat stay of the frame;

a rear magnet and a rear coil positioned between the rear wheel hub and the rear wheel axle and oriented so that relative rotation between the rear magnet and the rear coil induce an electrical signal in the rear coil; and a plurality of rear wheel light emitting diodes operatively connected to the rear coil so that the electrical signal selectively powers the plurality of rear wheel light emitting diodes, wherein the plurality of rear wheel light emitting diodes are nested in a plurality of openings of the rear wheel hub;

the front wheel assembly and the rear wheel assembly being connected to the bicycle assembly so that the plurality of front wheel light emitting diodes are oriented and powered to illuminate in a front wheel lighting schedule and so that the plurality of rear wheel light emitting diodes are oriented and powered to illuminate in a rear wheel lighting schedule that is different than the front wheel lighting schedule.

12. The assembly of claim 11 further comprising a control connected to one of the coil and the rear wheel coil and configured to wirelessly communicate with an input device positioned on the handlebar.

13. The assembly of claim 11 wherein at least the front wheel lighting schedule sequentially suspends operation of discrete LED's of the plurality of front wheel light emitting diodes when the respective discrete LED's of the plurality of front wheel light emitting diodes are radially oriented toward the rider with respect to rotation of the hub.

14. The assembly of claim 11 wherein at least one of the front wheel lighting schedule and the rear wheel lighting schedule includes positioning some of the respective light emitting diodes at a lateral outboard location relative to an adjacent spoke flange of the respective hub.

15. The assembly of claim 14 wherein the front wheel lighting schedule and the rear wheel lighting schedule illuminate respective light emitting diodes at different relative rotational positions of a respective hub relative to the other hub.

16. A method of forming a lighted bicycle wheel assembly of a bicycle comprising:

securing one of a magnet and a coil to an axle;

securing the other of the magnet and the coil to an inside of a hub;

concentrically orienting the axle and the hub so that the magnet is positioned proximate the coil to induce a current in the coil during rotation of the hub relative to the axle;

providing a lighting system that includes electrically connecting a first LED and a second LED to the coil so the current in the coil powers the first LED and the second LED;

securing the first LED and the second LED to the hub in alignment with respective openings formed in the hub; and controlling operation of the first LED and the second LED during use of the lighting system so that illumination of one of the first LED and the second LED is suspended when the one of the first LED and the second LED faces toward at least a face of a rider and independent of operation of the other of the first LED and the second LED.

17. The method of claim 16 further comprising securing the first LED and the second LED to the hub on opposite lateral sides of a spoke flange.

18. The method of claim 17 further comprising orienting the one of the first LED and the second LED that is on a lateral inboard side of the spoke flange in a more radial direction than the one of the first LED and the second LED that is on a lateral outboard side of the spoke flange.

19. The method of claim 16 wherein controlling operation of the first LED and the second LED further comprises providing a wireless interface having a first portion that is external to the hub and positioned for use by a rider during use of the bicycle and a second portion that is internal to the hub and configured to selectively control electrical connectivity between the first LED, the second LED and the coil.

20. The method of claim 16 further comprising connecting the lighted bicycle wheel assembly between at least one of a pair of chain stays and a pair of forks of the bicycle.

* * * * *